Aug. 17, 1926. 1,596,211
G. R. NELSON
POWER TRANSMISSION ATTACHMENT FOR MOTOR VEHICLES
Original Filed March 28, 1925
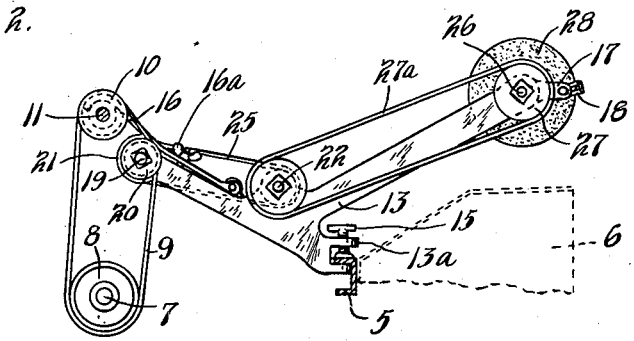
INVENTOR.
GEORGE R. NELSON.
BY HIS ATTORNEYS.

Patented Aug. 17, 1926.

1,596,211

UNITED STATES PATENT OFFICE.

GEORGE R. NELSON, OF CENTER CITY, MINNESOTA.

POWER-TRANSMISSION ATTACHMENT FOR MOTOR VEHICLES.

Application filed March 28, 1925. Serial No. 19,038.

This invention relates to power transmission attachments for motor vehicles, including automobiles, trucks, tractors, etc., whereby power may be transmitted from movable parts of the engine and applied to tools, farm machinery, etc., located adjacent the motor vehicle.

It is an object of the invention to provide an extremely simple but highly efficient power transmission device for motor vehicles which derives its source of power from the fan belt of the vehicle motor and transmits said power to one side of the vehicle body, preferably directly over one of the fenders.

It is an additional object to provide a power transmission device disposed transversely of a motor vehicle and rigidly secured to the frame thereof, also having means adapted to adjustably engage the bearing for the fan shaft of the motor whereby the pulley or other member contacting the fan belt of the motor may be held in proper working position.

It is a more specific object of the invention to provide in such a device a relatively thin angularly extended arm or frame having journaled therein pulleys or other rotatable members, one of which is adapted to engage the fan belt of a vehicle motor, the other of which is adapted to supply the source of power to one side of the vehicle driven from said first mentioned pulley.

A still further object of the invention is to provide a power transmission attachment which may be readily attached or detached on a motor vehicle without the use of tools or equipment.

These and other objects of the invention will be apparent from the following description made in connection with the accompanying drawings, wherein like characters refer to similar parts throughout the several views, and in which:—

Fig. 1 is a plan view of the device attached to the frame of a motor vehicle and engaging the fan belt thereof;

Fig. 2 is a vertical section showing most of the parts in elevation taken on the line 2—2 of Fig. 1;

Fig. 3 is a side elevation on an enlarged scale of the preferred form of the device with the engaged position of a part shown in dotted lines; and Fig. 4 is a side elevation of the device rigged for direct driving.

In the drawings, one of the longitudinal frame members of a motor vehicle is indicated by the numeral 5 having adjacent thereto the usual fender 6 illustrated in Fig. 2 by the dotted lines. The usual crank shaft 7 has the driving pulley 8 keyed thereto connected by the fan belt 9 to the fan pulley 10 rigidly secured to the fan shaft 11 which is journaled in the usual bearing 11$^a$. The fan itself is indicated by the numeral 12. The parts above referred to, as illustrated, are the standard parts of a Ford automobile, but, of course, the invention is applicable to all types of motor vehicles employing the fan.

In the preferred form of the invention illustrated, a relatively thin angularly extended frame or arm 13 is provided having transversely extending bearings therein at its inner and outer ends and a third transversely extending bearing 14 provided in its upper central portion. The arm 13 carries rigidly therewith a pair of jaws 13$^a$ having mounted therein the clamp screw 15 adapted to rigidly secure the device to the frame member 5 of the motor vehicle transversely thereof. A hook or grasping member 16 is hinged to the inner portion of the upper side of the angular arm 13 and is adapted to engage at its outer end the usual fan shaft bearing 11$^a$. The winged nut 16$^a$ engaging the threaded end of a bolt passing through member 16, is adapted to regulate the tension applied to grasping end of said member. At the outer extremity of the arm 13 an apertured lug 17 is carried to which a slotted tool rest 18 is adapted to be clamped or otherwise secured. The entire angular arm 13 is preferably cast integrally but may, of course, be of any other suitable construction.

A transverse shaft 19 is journaled in the bearing at the inner end of arm 13, having keyed thereto, the pulleys 20 and 21, one at either side of the frame 13. The pulley 20 is preferably of smaller circumference than pulley 21 and is adapted to engage the inner side of the fan belt 9 and be drawn outwardly thereagainst as desired by means of the clamping hook 16, controlled by the winged nut 16$^a$. The second detachable shaft 22 is journaled in the bearing 14, to which are keyed the pulleys 23 and 24, one on either side of the frame 13, and the pulley 24 is preferably connected for driving to the pulley 21, by means of the endless belt 25. A third detachable transverse shaft 26 is journaled in the bearing at the outer end of the arm 13 and carries the pulley 27 at one end thereof connected for driving to the pulley 23 by means of the endless belt 27ª. At the other end of shaft 26, a rotatable tool or power pulley may be readily secured and, in the drawings, an emery wheel 28 is shown keyed to said shaft.

In Fig. 4, the shaft 22 is detached and the pulley 27 disposed on the opposite side of shaft 26 and connected to the pulley 21 for direct driving therefrom by means of the belt or endless member 29.

The portion of the angular arm 13 extending from the frame 5 inwardly is of proper length to permit the pulley 20 to be disposed on the inner side of fan belt 9 and engage thereagainst, while the outwardly extending portion of the arm or frame 13 is of sufficient length to transmit power at a point directly above the front fender of the motor vehicle.

The clamp 15 permits the arm or frame 13 to be firmly secured to the main frame 5 of the vehicle, while the adjustable hinged hook 16 secures the inner end of the device about fan shaft bearing 11ª, holding the pulley 20 in proper engagement with the inner side of the fan belt. Obviously, by tightening the winged nut 16ª, the inner end of the arm 13 and pulley 20 will be swung upwardly and outwardly against the fan belt increasing the tension of pulley 20 thereagainst.

All of the pulleys employed are preferably readily detachable on their respective shafts and of different size and may be accordingly arranged as desired to reduce or increase the speed of the power transmitting shaft 26.

In motor vehicles, in which the fan is driven by an endless chain, a pinion may be substituted for the pulley 20, adapted to engage the inner side of said chain.

From the foregoing description, it will be apparent that applicant has invented an extremely simple but highly efficient device of ready attachment or detachment to a motor vehicle and adapted to supply power to a very convenient point at the outer side of said vehicle, namely, the point just above one of the front fenders 6. The arm 13 is constructed at the proper angle, of course, to permit the outer end thereof to clear said fender and be disposed in proper working position. Various farm machinery, lathes, tools and other devices may, of course, be driven from the outer end of said device, while, as illustrated, an emery wheel may be rigidly attached to the shaft 26.

The device has been put to considerable actual usage and has proven to be highly successful for the purposes intended.

It will, of course, be understood that considerable changes may be made in the form, details, proportions and arrangement of parts without departing from the scope of the invention.

What is claimed is:—

1. A power transmission attachment for motor vehicles, comprising a frame disposed transversely of a motor vehicle projecting beyond one side thereof, a rotatable member journaled in said frame adapted to engage the fan belt of a motor vehicle, and a second rotatable member journaled adjacent the outer end of said frame outside of said motor vehicle, driven by said first mentioned rotatable member.

2. A power transmission attachment for motor vehicles comprising a frame, means for securing said frame transversely of a motor vehicle, rotatable means at the inner end of said frame for engaging a movable part of a motor vehicle and means for transmitting the power from said rotatable means to the outer end of said frame.

3. A power transmission attachment for motor vehicles comprising an arm adapted to be rigidly secured transversely to a motor vehicle, a rotatable member journaled in the inner end of said arm adapted to engage the fan belt of a motor vehicle and be driven thereby, and a rotatable member journaled in the outer end of said arm, said rotatable members having their axes substantially parallel, and means for connecting said rotatable members to cause said last mentioned rotatable member to be driven by said first mentioned member.

4. The structure set forth in claim 3 and means on the intermediate portion of said arm for rigidly securing the same to the frame of said vehicle.

5. The structure set forth in claim 3, and means adjacent the inner end of said arm adapted to engage the bearing of the fan shaft of said motor vehicle.

6. A power transmission attachment for motor vehicles comprising an angularly extending arm having transversely extending bearings at its outer and inner ends, shafts journaled in said bearings, a pulley carried by said inner shaft adapted to engage against the fan belt of a motor vehicle, a pulley carried by said outer shaft connected for driving to said inner shaft, means on the depending portion of said arm for rigidly securing the device to one of the frame members of said vehicle and means adjacent the inner end of said arm for engaging the fan shaft bearing.

7. A power transmission attachment for motor vehicles comprising an arm having transversely extending bearings in its outer and inner ends and its intermediate portion, shafts journaled in said bearings carrying rotatable members on each side of said arm, one of said rotatable members on said inner shaft being adapted to engage a movable part of said vehicle and be driven thereby, endless driving members connected to said respective rotatable members to drive said outer shaft from said inner shaft and means for rigidly securing said arm to said motor vehicle in operative position.

8. A power transmission attachment for motor vehicles comprising an elongated frame, means for securing said frame transversely of a motor vehicle, rotatable means at the inner end of said frame for engaging the inner side of the fan belt of said motor vehicle, means adjacent the inner end of said arm for holding said rotatable means against said fan belt and means for transmitting power from said rotatable means to the outer end of said frame.

In testimony whereof I affix my signature.

GEORGE R. NELSON.